United States Patent [19]

Atencio

[11] 4,117,676
[45] Oct. 3, 1978

[54] INCORPORABLE HYDROMOTIVE ASSEMBLY

[76] Inventor: Francisco José Gutierrez Atencio, Diamante 3105, Entre Rios, Argentina

[21] Appl. No.: 717,515

[22] Filed: Aug. 25, 1976

[30] Foreign Application Priority Data

Sep. 3, 1975 [AR] Argentina .............................. 260247

[51] Int. Cl.$^2$ .............................................. F16D 33/00
[52] U.S. Cl. ...................................... 60/327; 60/398; 290/52; 137/123; 405/78
[58] Field of Search ................. 60/398, 496, 497, 501, 60/327; 61/19, 20, 90, 92; 290/52; 137/123, 124, 131

[56] References Cited

U.S. PATENT DOCUMENTS

| 2,652,693 | 9/1953 | Goldman et al. | 61/88 |
| 2,783,392 | 2/1957 | Corbiere | 290/52 |
| 3,246,475 | 4/1966 | Booth et al. | 61/92 |

FOREIGN PATENT DOCUMENTS

703,143  2/1931  France ........................................ 290/52

Primary Examiner—Edgar W. Geoghegan
Attorney, Agent, or Firm—Emory L. Groff, Jr.

[57] ABSTRACT

An incorporable hydromotive assembly for a water storing dam or related engineered structure includes a siphon draft conduit with ascending-descending branches adapted to be archingly positioned over a water storing structure for conveying water through the hydromotive assembly to actuate same. The assembly includes chambers defined around its structural body which can be filled with fluid to sink it, or with gas to float it. The incorporable ascending-descending siphon draft conduit includes structure for interchangeably permitting it to be archingly positioned over a plurality of dams or related water storing structures. The method of positioning the incorporable and transportable assembly at said dams for purposes of power generation is described.

10 Claims, 5 Drawing Figures

INCORPORABLE HYDROMOTIVE ASSEMBLY

BACKGROUND OF THE INVENTION

The present invention relates to hydroelectric assemblies to be incorporated at water storing engineered structures such as gates- fixed weir dams, spillways, navigable passes, beartraps, miter gates, non-utilized lockage structures, etc; for purposes of energy generation or energy accumulation; and more particularly to hydroelectric assemblies adapted to be interchangeably positioned at a plurality of such water storing engineered structures.

Hydromotive assemblies for hydroelectric production plants and more particularly, hydroelectric machines for very low heads and using siphon draft tubes with ascendingdescending flow water circulation paths are, obviously, well known in the art.

The aim of such hydromotive assemblies, archingly positioned over water retaining structures such as fixed crest dams, spillways, gates, etc. is to convert the inherent gravitational energy of the water stored in reservoirs behind these dams into electric energy. The importance of this conversion is particularly significant in low-head hydroelectric stations and in very variable low-head hydroelectric developments which are the most vulnerable to river flow seasonal variable hydrological conditions. In droughts, the water flow is so reduced that nearly all the firm capacity is lost while in floods, the hydraulic head is so reduced that the ability to produce electric power is also lost. The true aim is to develop a more flexible concept to adapt low-head hydroelectric generation stations to all these deterring hydrological situations. This transportable and incorporable hydromotive assembly concept provides the answer to cope with these technical dilemmas It is also known that in a hydroelectric station, the highest mechanical simplification is provided when technical means for starting and stopping the hydromotive machines avoids the use of gates, valves, and movable distributors. The incorporable hydromotive assembly engineered with the siphon draft tube of ascending-descending flow water circulation path concept, will fulfill this requirement because starting of the hydromotive machine is easily provided by actuation of a vacuum pump which produces air suction within the draft tube with consequent water low level rising and filling of the draft tube, thereby starting a hydromotive turbine automatically without the use of cumbersome gates, valves, or costly movable distributors.

Likewise, stopping of the hydromotive turbine is also easily achieved by actuation of a relief valve which provides air admission into the draft tube, thus producing disruption of the water flow.

Another mechanical simplification concerns the possibility of avoiding expensive tilting pad thrust supporting bearings and replacing them by conventional roller bearings. This possibility is developed because the upwards hydraulic thrust when the machine is in rotation, is nearly balanced by the weight of the rotating parts integrally combined with the turbine runner, the generator rotor and the connecting shaft, thus providing the possibility of installing cheaper roller bearings with consequent reduction in manufacturing costs and simplification in engineered design concepts and maintenance procedures.

The incorporable hydromotive assembly concept provides also a new kind of arrangement by means of which erection costs of expensive civil engineered structures for permitting support of these hydromotives turbines and hydroelectric machines, is simply avoided.

In nearly all the situations, hydropower production will be readily available without construction of concrete structures such as highly expensive and intricate water intakes, scrolls, bends, diffusers, etc.

A very compact arrangement is provided to fulfill this objective. This transportable and easily incorporable hydroelectric assembly can be positioned into a plurality and variety of water storing structures, thus leading to flexible concepts in hydroelectric generation erection engineered procedures.

It is also known that the best hydroelectric station engineered project must be designed under standardized patterns and mass produced industrial components. Furthermore, under operational performance, the concerned hydroelectric station must not have shutdown delays for cause of maintenance procedures on generators and turbines. It must have also, a low investment figure in terms of money expended per kW. of installed capacity.

Additionally, the erection time schedule required to install turbines and generators and put them in operation must be as short as possible.

All these objectives are claimed to be made possible by means of the present invention. These considerations, which not only take into account mechanical simplicity but also financial requirements, have not been fulfilled up to the present time because the technology in low-head hydroelectric generation has not advanced enough in efficient terms to keep pace with the most massive nuclear electric generation development. Consequently, many hydraulic structures designed for non-energy production purposes; and which today could be utilized for hydroelectric production, are inoperative and not being employed in a profitable status.

Because of the inherent simplified mechanical engineered design and cheaper manufactured components together with mass produced interchangeable parts, vertical or slant-axis capsule-mounted generators with fix-bladed propellers, or movable-bladed Kaplan turbines acting as motive machines working with draft siphon tubes having ascending-descending water flow circulation paths, can be expected to be progressively introduced and put into operation in the forthcoming years.

Another object of the present invention is to provide a novel hydrostation engineered arrangement whereby hydraulic structures already built for other purposes such as dams for navigation systems, inoperative locks, abandoned dikes, structures for irrigation intakes, etc. can be easily converted into hydropower generation systems.

A further object of the present invention is to provide a new technique designed to improve actual hydroelectric tactical exploitation procedures by means of incorporable and transportable hydroelectric stations to be readily embodied at such hydraulic engineered structures or moved away from said structures following the changes imposed by the variable hydrological status of the involved rivers.

In other terms, when a river flow decreases due to a drought, these incorporable and transportable hydromotive stations are removed from the inoperative hydraulic structures and transferred to other watersheds having operative hydraulic structures. Inversely, when a flood condition imposes a non-producing hydroelectric status due to head reduction, these transportable and incorporable hydroelectric assemblies are mobilized and reinstalled in other watersheds to be placed in operation once again.

This novelty in low-head hydroelectric generation provides an improved flexible tactical arrangement for purposes of electric generation planning in river watersheds heretofore considered energetically unprofitable and impossible.

According to one aspect of the present invention, there is provided a transportable and incorporable hydromotive assembly for energy transformation purpose which to be installed against the structural body of a dam or related engineered water retaining structure. In the overall general arrangement this incorporable hydromotive assembly is archingly positioned over said dam or engineered structure.

Incorporated is a water conduit or draft siphon tube providing an ascending-descending water flow circulation path, defined by a lateral wall surrounding the hydromotive machine and having a first open end for water admission and a second open end for discharging water entering the first open end. Auxiliary means are provided for purpose of water flow circulation starting and for water flow circulation disruption as is well known in the art.

The incorporable hydromotive assembly is provided with at least one chamber defined in its surrounding engineered structure having a volume at least sufficient to cause sinking or floatation of the incorporable hydromotive assembly when the chamber is filled with liquid or gas, respectively. By providing a plurality of these chambers the sinking or floatation procedure can be accomplished in any desired controlled position of the hydromotive assembly. Means are also provided for filling the chambers with fluid for sinking purposes or with gas for floatation purposes, this means can also be provided from a portable source external from the hydromotive assembly.

Another method for providing controllable sinking or floatation of said hydromotive assembly is by means of incorporable ballast weights positioned around the structural embodiment of the hydromotive assembly. Optionally, this structural embodiment may incorporate a machine hall with all the required mechanical equipment for purposes of operational control of the hydromotive turbine and generator sets such as turbine governors, generator controls, compressed air systems, electric transformers, switching stations, relay systems, emergency energy sources. etc.

According to an even further aim of the present invention there is provided a new conception in engineering design of hydroelectric stations which avoids the machine hall and related powerhouse structures. With this arrangement, maintenance of motive machines is simplified too. Machines which require overhauls are instantly shifted away and replaced by operative ones arriving from the service center. Thus, a unique service station is provided for purposes of maintenance of a plurality of hydroelectric stations, thereby revolutionizing the engineering servicing technology in hydroelectric generation.

For purposes of archingly positioning the siphon draft tube with its ascending-descending water flow circulation path, over the variable transverse embodiment of a plurality of spillways or water storing engineered structures, thus producing the interchangeable condition required to fulfill the required incorporable feature means are provided for adapting the siphon draft tube structure to variable transversely sectionalized spillway profiles. These means are integrated by a variety of technical devices such as movable supports or movable steel plates, jacking arrangements, hydraulic bolting or movable fastening structure, etc. as is well known in the art.

According to an even further aspect of the present invention, a method is provided for incorporably positioning the hydromotive assembly over water retaining structure and archingly securing it into this position. The method comprises the steps of: (a) Taking a hydromotive assembly having a structural body, a first water open end and a second water open end and at least one chamber structurally combined with the body. (b) Floating the hydromotive assembly slightly upstream of the engineered dam water retaining structure and so oriented that the longitudinal axis of the water flow circulation path is substantially perpendicular to the longitudinal axis of the dam, and with the second open end positioned substantially thereabove the crest of said dam. (c) Drawing the incorporable hydroelectric assembly movably towards the dam water retaining structure until the second open end is positioned entirely downstream of the dam water retaining structure. (d) Introducing a liquid into the body chamber to cause sinking of the incorporable hydromotive assembly or alternatively, adding ballast weights to the structural body to cause sinking of the hydromotive assembly. (e) Directing the sinking incorporable hydromotive assembly until it rests slightly on the bottom supporting means or alternatively, until it is archingly positioned over the dam water retaining structure. (f) Securing the incorporated hydromotive assembly in such position.

Although most references in the specification are applied to hydromotive assemblies arranged following the siphon draft tube ascending-descending water flow circulation path system it will be obvious to those skilled in the art that the teachings of the present invention are free of the specific linear layout of said path and that the present invention is applicable to assemblies in which such geometric spatial configuration follows any pattern, such as a substantially rectilinear one.

DESCRIPTION OF THE PREFERRED EMBODIMENT

Figure 1:
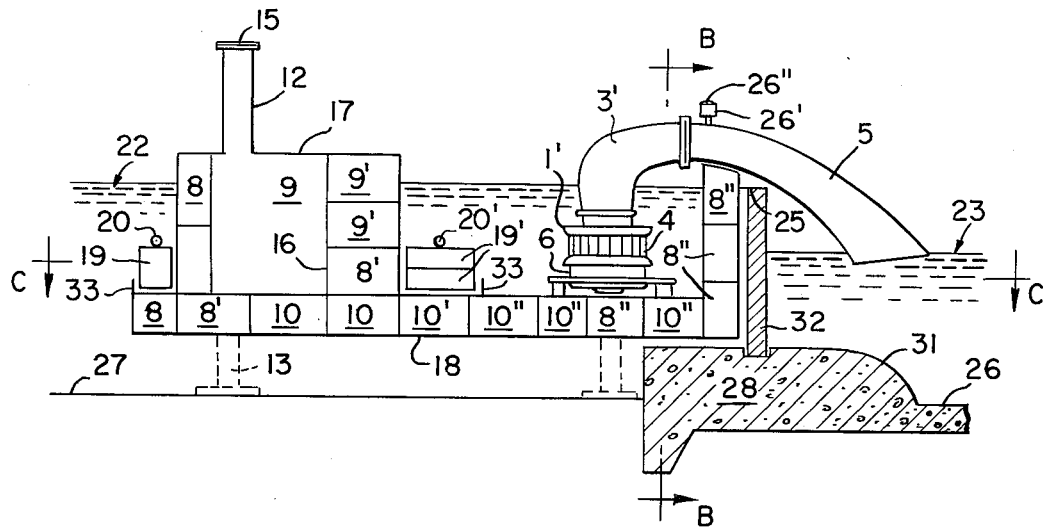
FIG. 1 is a schematic representation of an incorporable hydromotive assembly comprising a longitudinal vertical cross section through the structural body incorporating the hydroelectric machine with a siphon draft tube, taken along the line A—A of FIGS. 2 and 3.
Figure 2:
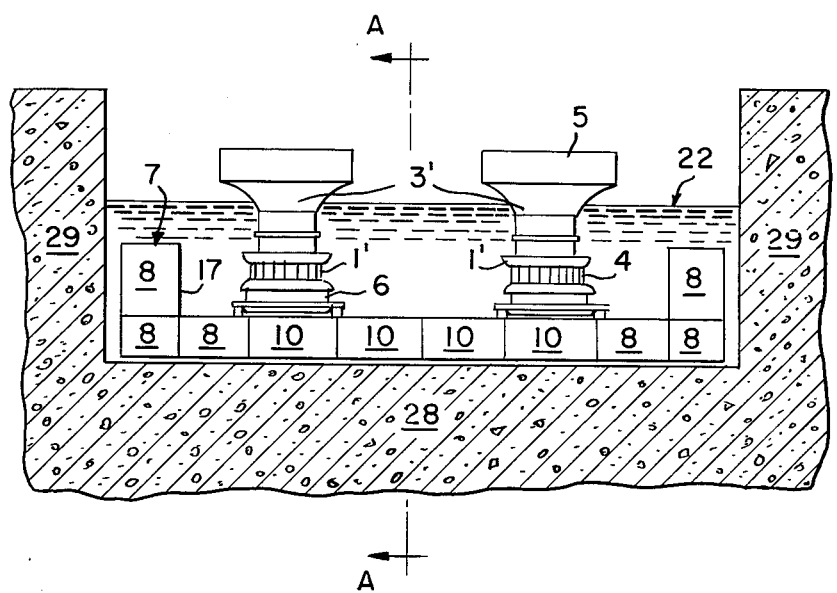
FIG. 2 is a horizontal transverse cross section taken along the line B—B of FIGS. 1 and 3.
Figure 3:
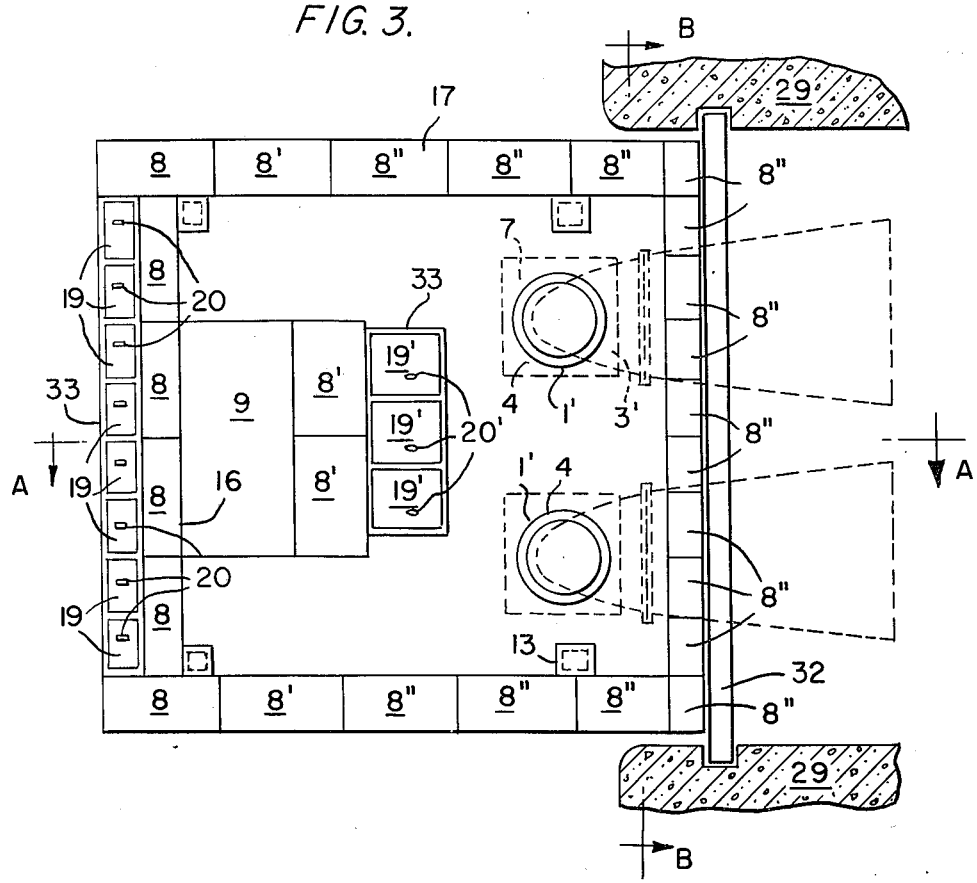
FIG. 3 is a horizontal transverse cross section taken long the line C—C of FIG. 1.

FIGS. 1, 2 and 3 schematically illustrate an incorporable hydromotive assembly adapted to be archingly positioned over a dam, fixed crest dam, spillway of a dam, a gate, a miter gate, or any other similar water engineered retaining structure. The hydropower generation equipment includes the hydromotive group 1', the electric generator enclosed within the capsule 6, the water inlet 4, the ascending branch 3' of the draft siphon tube or conduit and the structural supporting base 7 beneath the generator turbine set.

Structurally contained within the base are a plurality of chambers 8, 8', 9, 9', 9" and 10, 10', 10" which are disposed according to a defined engineered pattern adapted to produce floating of the hydromotive assembly in fluid means, and defined by the external wall 17 and bottom wall 18. All these chambers are defined also by internal walls 16. They are positioned one beside another and extend substantially below and laterally around the hydromotive assembly as shown in FIGS. 1–4. Chambers 8, 8' and 8" are preferably intended to be filled with liquid to cause sinking of the hydromotive assembly or with gas to cause floatation thereof while chambers 9, 9' and 9" are preferably service chambers and house auxiliary equipment such as governors, compressed air machines, generator controls, electric relays, transformers, etc. Chambers 10, 10' and 10" are mainly for internal ballasting purposes for stabilizing floatation of the transportable assembly during navigation thereof. It has been found that although a chamber replacing chambers 8, 8' and 8" may be adequate for the purposes of the present invention, it is preferable to provide a plurality of individual chambers as shown in the drawings.

These chambers are individually connected to a main duct (not shown) which provides the required amount of pressurized gas or compressed air to produce the displacement of the liquid enclosed therein for floatation purposes of the incorporable hydromotive assembly. Similarly, one inlet for liquid admission for each chamber, and one outlet for liquid exhaustion for each chamber are also provided (not shown).

The gross volume defined by the chambers 8, 8' and 8" of the incorporable structural embodiment adapted to be filled with liquid is at least sufficient to cause sinking of the entire corporable assembly when filled with liquid. Likewise, this gross volume is at least sufficient to cause floatation of the incorporable hydromotive assembly when they are filled with gas or with air, for transportation or dam approaching purposes. Both sinking and floatation sequences are developed in any desired controlled position of the incorporable hydromotive assembly relative to the water body surrounding it.

Another method to provide sinking of the hydromotive incorporable assembly is by means of incorporable external ballast weights 19, 19' installed and removed with cranes by means of the attached hoops 20. 20'. The weights are lodged within the recesses 33 defined adjacent the external walls 17 of the structure as shown in FIGS. 1, 3 and 4.

The body of the incorporable hydromotive assembly comprises an external wall 17 and a reinforced bottom lower wall 18. This bottom wall 18 can be disposed on a concrete slab 27 thus transmitting the weight of the submerged incorporated hydromotive assembly to the rocky bottom or to the related adjacent engineered structure.

Another means of positioning the incorporated structure is shown by the supporting extensible legs 13 arranged to be lodged through recesses embodied within the structural bottom wall 18 of the assembly and secured thereto.

Figure 4:
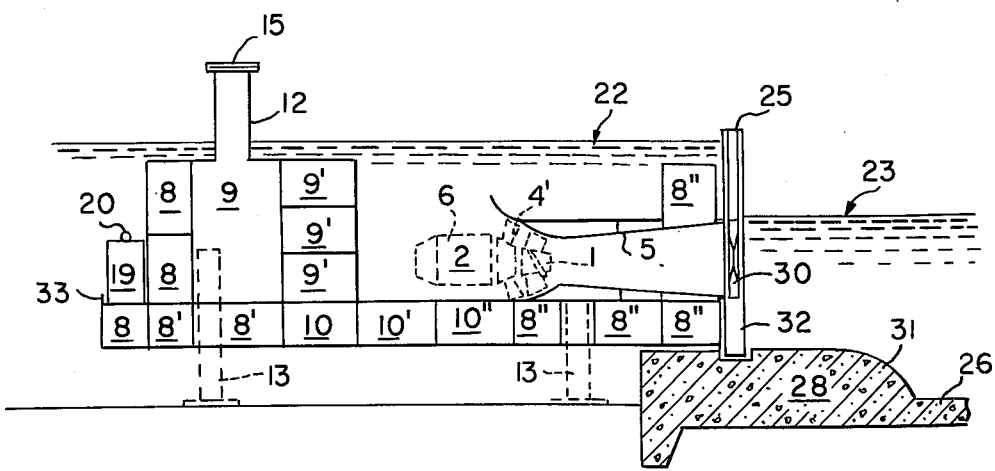
FIG. 4 is a longitudinal vertical cross section through an incorporable hydromotive assembly comprising a hydroelectric machine with a rectilinear frusto-conical draft tube diffuser.

Access means 12 with a cover 15 are provided to enable an operator to approach the internal machine hall for purposes of servicing, inspection, repairs, etc. as shown in FIGS. 1 and 4.

In FIGS. 1, 2 and 3, the incorporable hydromotive assembly is archingly positioned over the top face 25 of the water retaining wall or structure 32 which in turn is fitted in emergency closing gate slots of the lateral walls 29 of the dam body 28 which together, define the spillway 31 of the dam. The hydraulic head differential between water bodies 22 and 23 is thus defined by said retaining structure 32. As previously mentioned, legs 13 support the assembly over the concrete slab 27. Additionally, the dam body may include further base support 26 downstream of the spillway 31.

In FIG. 4 the incorporated hydromotive assembly includes a turbine 1, the generator 2, the distributor 4', the substantially rectilinear frusto-conical draft tube 5, the generator capsule 6, chambers 8, 8', 9, 9' and 10. 10', access means 12 with a cover 15, supporting legs 13, ballast means 19 and hoops 20, recesses 33 to lodge ballast means, water body levels 22 and 23 retained by means of closing gate 32 positioned in slots in the lateral walls (not shown) and the spillway 31 of the dam body 28.

A secondary gate 30 is actuated from the upper end or top face of the body of the main gate 32 and is movable therein. This secondary gate 30 provides flow regulation, starting and stopping of the hydromotive machine fitted with the fix-bladed turbine 1 and distributors 4, such as hydroelectric sets with asynchronous generators, which sets generally are limited to power outputs of a few thousand kW. In other hydroelectric machine embodiments, with movable distributor 4 and turbine blades 1 the secondary gate 30 acts as an emergency mechanical closure. In use, the outlet of the substantially rectilinear frusto-conical draft tube 5 is positioned and sealed against the inlet of the secondary gate 30 as shown in FIG. 4 and then, the gate is opened and the fix-bladed hydromotive machine is started.

Alternatively, the main closing water retaining gate 32 may be integrally embodied and structurally combined with the main body of the incorporable hydroelectric assembly in the structural area surrounding the second open end of the rectilinear draft tube 5. The foregoing allows incorporating an integrally transportable closure device to be positioned against the upper face of the dam 28 and lateral walls 29 which defines the spillway chute 31 in such a way that the water head differential is produced between water body levels 22 and 23 by means integrally arranged and structurally embodied in the transportable and incorporable hydromotive assembly. Said water head differential is produced once the gate of the spillway is raised and opened.

Once the incorporable hydromotive assembly has been positioned with the incorporated closure water retaining structure 32 against the upstream face of the dam it is supported by legs 13 resting on bottom supporting means and ballasted over said supporting legs, thus securing its position relative the dam.

Figure 5:
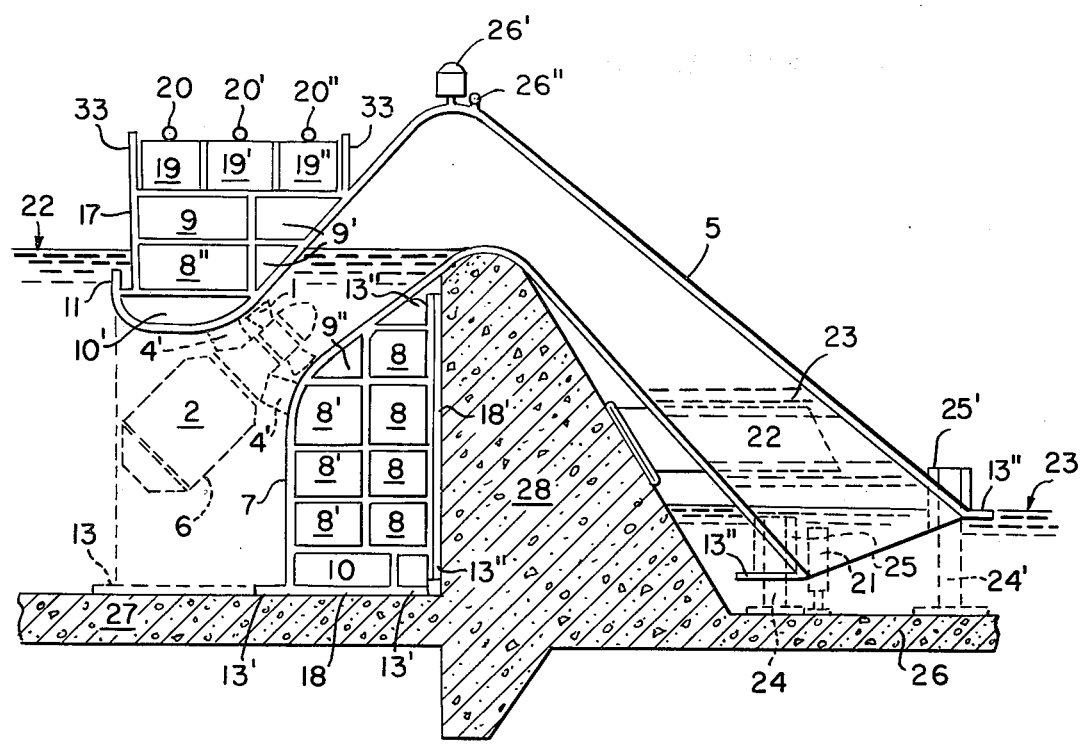
FIG. 5 is a longitudinal vertical cross section taken through a slant-axis hydromotive assembly having a siphon draft tube archingly positioned over the spillway of a dam and illustrating a more compact engineered design.

In FIG. 5 the archingly incorporated hydromotive assembly is designed according to a more compact engineered arrangement. Here, the water conduit wall 7 surrounds the capsule 6 of the generator and defines the ascending branch of the siphon draft tube 5. Chambers 8, 8', 8", 9, 9', 9" and 10, 10' 10" are positioned one beside another and extend forwardly substantially from the intake flange end 11, as well as annularly around the structural wall 7 forming the ascending branch of the draft tube.

Actuating water flow is conveyed through the hydraulic turbine 1 following the annular path defined between the wall 6 of the generator capsule and wall 7 of the water directing conduit. Turbine 1 and distributor 4', if having moving blades, provide control of the water flow and regulation of the generator output. Starting and stopping of the assembly is produced by means of the vacuum pump 26' and relief valve 26", both connected to the upper portion of siphon draft tube 5, respectively. Analogous elements 26' and 26" may also be employed in the other embodiment as shown in FIG. 1.

The body of this incorporable hydromotive assembly comprises an external wall 17 and a reinforced supporting base or bottom wall 18 which can be disposed on the concrete slab 27 positioned upstream of the dam, by means of bolted flanges 13', or related mechanical devices as is well known in the art.

A secondary lateral supporting face 18', could optionally be supported against the upstream face of the dam, dam spillway, or dam water conveying means, and be secured thereto by means of bolted flanges 13", thus providing a better defined incorporability arrangement.

As described previously, the archingly supported siphon draft tube structure is secured to the face of the dam by means of a variety of devices such as hydraulic or mechanical jacks 21, and secured thereto, supporting legs 24, 24', displaced within recesses 25, 25', embodied adjacent flanges 13" on the draft tube structure and secured thereto, or by any other technical arrangement designed to provide interchangeability and the archingly positioning of the draft tube in any desired shaped dam or spillway transverse profile.

These incorporable hydromotive assemblies could be arranged individually in single machines or in a combination of a plurality of machines structurally combined in a single incorporable and transportable structure.

It will be understood that improvements or modifications may be introduced in the embodiments described by way of example without departing from the scope of the invention specifically defined in the following claims.

I claim:

1. An incorporable hydromotive assembly for an energy storing dam having means for retaining water behind it, said assembly including, a water conduit having a lateral wall defining a first open end and a second open end, said conduit provided with an ascending branch having said first open end and joined with a descending branch having said second open end, energy generation means disposed adjacent said ascending branch open end and adapted for actuation as water is directed through said conduit into said first open end and out through said second end and at least one chamber structurally fixed relative said assembly and of a volume at least sufficient to provide floatation and sinking of said assembly when said chamber is filled with gas or liquid, respectively, to position said assembly adjacent said water retaining means with said conduit archingly disposed over said water retaining means.

2. An incorporable hydromotive assembly according to claim 1, including means for filling said chamber with a liquid for sinking purposes or with gas for floatation purposes.

3. An incorporable hydromotive assembly according to claim 1, including a plurality of said chambers disposed to cause sinking or floatation of said hydromotive assembly in any desired controlled position when said chambers are filled with liquid or gas, respectively.

4. An incorporable hydromotive assembly according to claim 3, including means disposed in said conduit lateral wall for interchangeably permitting the archingly positioning of said hydromotive assembly over any one of a plurality of said dam water retaining means.

5. An incorporable hydromotive assembly according to claim 4 including, means provided for securing in a fixed manner said incorporated hydromotive assembly in a position with said conduit first open end fully submerged in dam water upstream of said retaining means and with said conduit second open end fully submerged in water body downstream of said retaining means.

6. An incorporable hydromotive assembly for an energy storing dam having means for retaining water behind it, said hydromotive assembly including, a water ascending descending flow circulation path defined by a conduit having a lateral wall for directing water through an included energy generation unit to cause actuation thereof, said conduit having a first open end and a second open end for discharging water entering said first open end, said conduit adapted to be archingly positioned over said dam water retaining means, and means, provided in said conduit lateral wall for movably permitting actuation of said hydromotive assembly when removed from or positioned above said dam water retaining means.

7. An incorporable hydromotive assembly according to claim 6 including, means defined in said conduit lateral wall for interchangeably permitting the archingly positioning of said hydromotive assembly over any one of a plurality of said dam water retaining means.

8. An incorporable hydromotive assembly according to claim 7 including, means provided for securing said incorporated hydromotive assembly in a position in which said conduit first open end is fully submerged in dam water upstream of said retaining means and said conduit second open end is fully submerged in water body downstream of said retaining means.

9. In an energy storing structure including means for retaining a body of water behind it, the improvement comprising, an incorporated hydromotive assembly archingly positioned over said structure, said hydromotive assembly provided with a water ascending-descending flow circulation path defined by a conduit having a lateral wall for directing water through an included energy generation unit for causing actuation thereof, said conduit having a first open end fully submerged in upstream water behind said retaining means and a second open end fully submerged in water body downstream of said retaining means, at least one chamber included in said hydromotive assembly and of a volume at least sufficient to cause sinking or floatation of said hydromotive assembly when said chamber is filled with liquid or gas, respectively, and means included in said lateral wall for securing said conduit in a archingly position over said retaining means to maintain said first and second open ends both fully submerged in water.

10. A method of positioning an incorporable hydromotive assembly in a dam having means for retaining water behind it and supporting means extending upstream and downstream of said water retaining means, the method comprising the steps of: (a) taking a hydromotive assembly including a water ascending-descending flow circulation path defined by a conduit having a lateral wall for directing water through an included energy transformation unit for causing actuation thereof, said conduit having a first open end and a second open for discharging water entering the first open end, said conduit adapted to be archingly positioned over said dam water retaining means and provided with at least one chamber structurally included with said hydromotive assembly, or ballast means connectable therewith; (b) floating said hydromotive assembly slightly upstream of said dam and oriented so that the longitudinal axis of said hydromotive assembly which extends through said conduit open ends, is substantially perpendicular to the longitudinal axis of the body of said dam and positioned substantially with said second open end above the crest of said dam; (c) floating the incorporable hydromotive assembly towards said dam until said conduit second open end is entirely positioned downstream of said retaining means of said dam; (d) introducing liquid into said chamber to cause sinking of said hydromotive assembly or, alternatively, incorporating ballasts therein; (e) directing the sinking hydromotive assembly until said conduit is archingly positioned over said dam water retaining means or, alternatively, until resting upon said supporting means; (f) securing said incorporated hydromotive assembly in such position.

* * * * *